(12) United States Patent
Suhara et al.

(10) Patent No.: US 8,854,061 B2
(45) Date of Patent: Oct. 7, 2014

(54) LINEAR SENSOR

(75) Inventors: Katsuhiro Suhara, Kiyosu (JP); Satoshi Toki, Kiyosu (JP); Toshihiro Okamoto, Kiyosu (JP); Yuzo Tajima, Kiyosu (JP); Taizo Shibata, Kiyosu (JP); Noboru Sakakibara, Kiyosu (JP); Osamu Ito, Kiyosu (JP)

(73) Assignee: Toyoda Gosei Co., Ltd, Kiyosu-Shi, Aichi-Ken (JP)

( * ) Notice: Subject to any disclaimer, the term of this patent is extended or adjusted under 35 U.S.C. 154(b) by 327 days.

(21) Appl. No.: 13/064,557

(22) Filed: Mar. 30, 2011

(65) Prior Publication Data

US 2011/0241705 A1    Oct. 6, 2011

(30) Foreign Application Priority Data

Mar. 31, 2010    (JP) ................. P2010-080007

(51) Int. Cl.
```
G01R 27/26      (2006.01)
E05F 15/00      (2006.01)
H01H 3/14       (2006.01)
G01D 5/241      (2006.01)
```

(52) U.S. Cl.
CPC ....... *E05F 15/0073* (2013.01); *E05Y 2900/531* (2013.01); *H01H 3/142* (2013.01); *G01D 5/2417* (2013.01)
USPC .............. 324/679; 49/27; 49/28; 200/61.43; 73/780

(58) Field of Classification Search
CPC  E05F 15/0073; G01D 5/2417; H03K 17/955; H03K 17/975; H03K 2217/96078; H01H 3/142

USPC ........................................... 324/679
See application file for complete search history.

(56) References Cited

U.S. PATENT DOCUMENTS 4,115,952 A * 9/1978 French ............... 49/26
4,273,974 A * 6/1981 Miller ............ 200/61.43

(Continued)

FOREIGN PATENT DOCUMENTS

JP    2000-329506 A    11/2000
JP    2006-501388 A    1/2006

(Continued)

OTHER PUBLICATIONS

Japanese Office Action dated Jul. 10, 2012, with English translation.

*Primary Examiner* — Melissa Koval
*Assistant Examiner* — Stephen G Armstrong
(74) *Attorney, Agent, or Firm* — McGinn IP Law Group, PLLC

(57) ABSTRACT

A linear sensor 21 includes an attachment base 22 attached to a metallic edge of a slide door 2 capable of opening and closing a platform 4, a skin cover part 23 which bulges from the attachment base 22 and has a hollow part 24 in the inside, an insulator 25 which has flexibility and also is embedded in the hollow part 24, and a plate-shaped electrode 26 opposed to the attachment base 22, at least a portion of the electrode being embedded in the insulator 25. In the hollow part 24, a gap 27 is disposed between the electrode 26 and the attachment base 22 and also, the electrode 26 is set in a plus pole and the attachment base 22 is set in a minus pole as the grounding, and proximity and/or contact between a foreign body and the skin cover part 23 is detected based on a change in capacitance between the electrode 26 and the grounding minus pole.

20 Claims, 6 Drawing Sheets

(56) References Cited

U.S. PATENT DOCUMENTS

| | | | |
|---|---|---|---|
| 5,259,143 A * | 11/1993 | Mitchell et al. | 49/27 |
| 5,459,962 A * | 10/1995 | Bonne et al. | 49/28 |
| 6,534,731 B1 * | 3/2003 | Beckhausen et al. | 200/61.43 |
| 6,740,826 B1 * | 5/2004 | Friedrich et al. | 200/61.43 |
| 6,782,759 B2 * | 8/2004 | Shank et al. | 73/780 |
| 6,896,268 B2 * | 5/2005 | Hofmann et al. | 277/317 |
| 2003/0056600 A1 | 3/2003 | Shank et al. | |
| 2003/0081369 A1 * | 5/2003 | Haag et al. | 361/302 |
| 2003/0233790 A1 * | 12/2003 | Nuber | 49/28 |
| 2005/0016290 A1 | 1/2005 | Shank et al. | |
| 2009/0218978 A1 * | 9/2009 | Kato et al. | 318/478 |

FOREIGN PATENT DOCUMENTS

| | | |
|---|---|---|
| JP | 2007-108003 A | 4/2007 |
| JP | 2008-031731 A | 2/2008 |
| JP | 2009-180013 A | 8/2009 |
| WO | WO 2004/031520 A1 | 4/2004 |

* cited by examiner

LINEAR SENSOR

BACKGROUND OF THE INVENTION

1. Field of the Invention

The present invention relates to a sensor for detecting a foreign body, and particularly to a linear sensor for detecting a foreign body pinched between a vehicle body and an opening and closing body such as a door in a vehicle such as an automobile.

2. Related Art

Conventionally, some vehicles such as the so-called minivan include a slide door for sliding along a body of the vehicle so as not to separate the door from the body while improving convenience of getting on and off the vehicle by widely opening and closing a platform of occupants. Also in recent years, devices for automatically opening and closing this slide door using a motor etc. are known.

In a system for opening and closing such a door, it is necessary to be constructed so as not to pinch foreign bodies (for example, the human body or clothes) during automatic closing of the slide door. Because of that, a sensor for detecting the foreign body and a mechanism for performing reverse control in an opening direction while stopping the slide door when the foreign body is, detected by the sensor are provided. Here, as the sensor, a capacitance type sensor made by arranging two opposed electrodes inside a linear cover body is proposed.

The capacitance type sensor is a sensor for detecting the foreign body based on a change in capacitance measured through the electrodes, and can detect the foreign body having relatively large capacitance such as the human body in a noncontact state. Also, a technique for disposing space between both electrodes in order to improve accuracy of detection with respect to the foreign body having relatively small capacitance is proposed (for example, see JP-A-2000-329506). According to the technique, a distance between both electrodes can be changed greatly even when a pressure at the time of making contact with the foreign body is relatively low. As a result, the amount of change in capacitance can be increased and the foreign body can be detected with high accuracy.

However, according to the art described above, at least two electrodes are required. Also, the respective electrodes must be placed in predetermined positions of the inside of the linear cover body while maintaining a positional relation between the two electrodes. Because of that, it becomes difficult to manufacture the sensor. That is, the art described above is not necessarily advantageous in aspects of manufacturing work and the number of components and as a result, a manufacturing cost may increase.

SUMMARY OF THE INVENTION

The invention has been implemented in view of the circumstances described above, and an object of the invention is to provide a linear sensor capable of reducing the manufacturing cost while maintaining sufficient accuracy of detection of the foreign body.

Examples suitable to solve the object will hereinafter be classified and described. In addition, action and effect peculiar to the corresponding means are appended as necessary.

Example 1

A linear sensor including:

an attachment base attached to a metallic edge of an opening and closing body capable of opening and closing an opening disposed in a vehicle body, a skin cover part which bulges from the attachment base toward a peripheral edge side of the opening and has a hollow part in the inside, an insulator which has flexibility and also is embedded in the hollow part, and a plate-shaped electrode opposed to the attachment base, at least a portion of the electrode being embedded in the insulator, wherein a gap is disposed between the electrode and the attachment base in the hollow part, and also the electrode is set in a plus pole and the attachment base is set in a minus pole as the grounding, and proximity and/or contact between a foreign body and the skin cover part is detected based on a change in capacitance between the electrode and the grounding minus pole.

According to the example 1, the attachment base is used as the grounding minus pole, so that even for the one electrode disposed, the foreign body can be detected based on the capacitance between the electrode and the attachment base. Therefore, a material cost can be reduced as compared with the case of disposing two electrodes. Also, according to the example 1, in the case of manufacturing the sensor, work of adjusting a positional relation between mutual electrodes is not required, and the insulator in which the electrode is embedded needs only to be placed so as to have a predetermined positional relation to the attachment base. As a result, the sensor can be manufactured very easily and in combination with the reduction in the material cost, a manufacturing cost can be reduced remarkably.

Also, in view of sensitivity for detecting the foreign body by the linear sensor of the example 1, for a foreign body with relatively large capacitance such as the human body, the capacitance between the electrode and the attachment base (the grounding minus pole) changes relatively greatly in a stage of approaching the sensor, so that the foreign body can be detected with high sensitivity in a noncontact state. Further, since the gap is disposed between the electrode and the attachment base, for a foreign body with small capacitance or a foreign body with a small contact area such as a pencil, the foreign body makes contact with the sensor (the skin cover part) and the gap is crushed and deformed and thereby, the capacitance can be changed greatly. That is, according to the example 1, even the foreign body with the small capacitance or the small contact area as well as the human body etc. can be detected with high sensitivity.

In addition, in order to exert the action and effect according to the example 1 more securely, a maximum value of a distance between the electrode and the attachment base is desirably set at 0.5 mm or more in the gap. On the other hand, the amount of change in capacitance between the electrode and the attachment base decreases as the distance between the electrode and the attachment base is increased even when the amount of crush and deformation of the gap is the same. Therefore, the maximum value of the distance between the electrode and the attachment base is desirably set at 3.0 mm or less in the gap.

Example 2

A linear sensor as described in the example 1, wherein a surface opposed to the attachment base in the electrode is covered with the insulator and also a thickness of a cover part of the insulator with which the opposed surface in the electrode is covered is set in the range of 50 μm to 300 μm.

According to the example 2, the electrode is constructed so as not to be exposed to a surface of the insulator by disposing the cover part. Therefore, for example, when the foreign body makes contact with the sensor, the electrode can be prevented from making contact with the attachment base when the gap is crushed and deformed, and wear and damage of the electrode can be prevented. As a result, the foreign body can be detected with high sensitivity over a longer period.

In addition, in order to sufficiently exert an effect of presenting the wear and damage of the electrode, the thickness of the cover part is preferably set at 50 μm or more, more preferably, 100 μm or more. However, when the thickness of the cover part is thickened excessively, sensitivity of detection of the foreign body may decrease. Therefore, in order to maintain high sensitivity of detection, the thickness of the cover part is preferably set at 300 μm or less, more preferably, 200 μm or less.

Example 3

A linear sensor as described in the example 1 or 2, wherein an insulator side projection protruding toward the skin cover part is disposed in the insulator.

According to the example 3, a distance between the insulator and the skin cover part can be made relatively short by the insulator side projection disposed in the insulator. Therefore, even when the amount of deformation of the skin cover part in the case of making contact with the foreign body is small, the insulator can be deformed and thus the gap can be crushed and deformed more securely. As a result, the accuracy of detection of the foreign body can be improved further.

Example 4

A linear sensor as described in any of the examples 1-3, wherein a cover side projection protruding toward the insulator side is disposed in an inner peripheral surface of the skin cover part.

According to the example 4, the gap can be crushed and deformed more securely even when the amount of deformation of the skin cover part associated with contact with the foreign body is relatively small in a manner similar to the example 3. Consequently, the accuracy of detection of the foreign body can be improved further.

Example 5

A linear sensor as described in any of the examples 1-4, wherein two legs extending so as to intersect with a direction orthogonal to the surface opposed to the attachment base in the electrode are disposed in regions of the attachment base side in the insulator and the gap is disposed between both of the legs.

According to the example 5, a shape of the gap can be maintained more securely by the two legs, and the action and effect according to the example 1 etc. can be exerted more securely.

Also, the legs extend so as to intersect with the direction orthogonal to the opposed surface in the electrode. As a result, a situation in which crush and deformation of the gap is inhibited can more securely be suppressed by the legs.

Example 6

A linear sensor as described in any of the examples 1-5, wherein space made of air is disposed between the skin cover part and the insulator.

When water adheres to the sensor or the periphery of the sensor due to rain etc. in the case of a configuration of no gap between the cover body and the electrode as shown in the art described in JP-A-2000-329506, capacitance changes relatively greatly. Therefore, a wrong determination due to the adhesion of a water drop may be made.

In this respect, according to the example 6, the space (gap) which is filled with air and has a relatively low dielectric constant is disposed between the skin cover part and the insulator. As a result, the amount of change in capacitance at the time when the water drop adheres can be made relatively small, with the result that the wrong determination can be prevented more securely.

DETAILED DESCRIPTION OF THE PREFERRED EMBODIMENTS

One embodiment will hereinafter be described with reference to the drawings.

Figure 1:
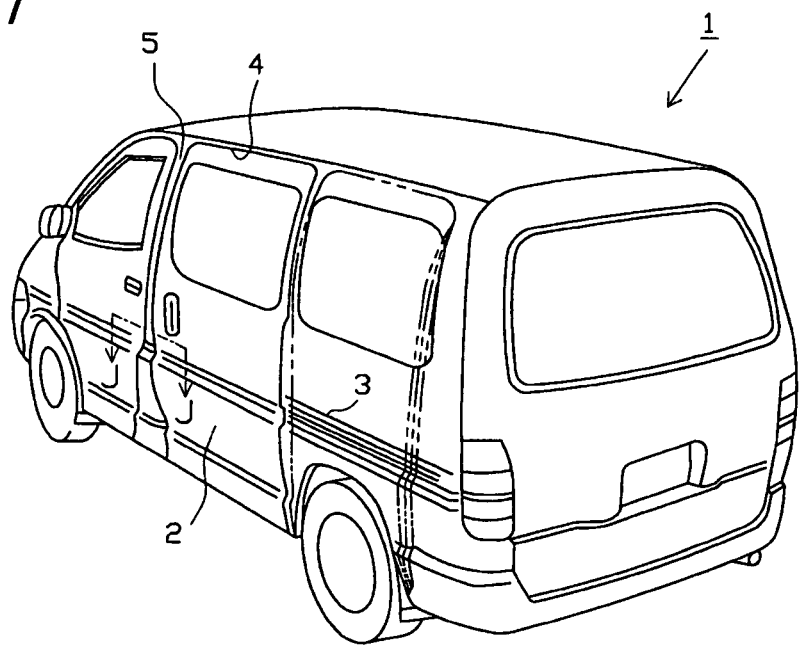
FIG. 1 is a perspective view showing a vehicle including a slide door.

FIG. 1 is a schematic perspective view of a vehicle equipped with a slide door. As shown in the same view, a vehicle 1 has a metallic slide door 2 (corresponding to an "opening and closing body" of the invention) on a side surface of a body of the vehicle. The slide door 2 is supported on the body side surface by a slide rail 3 disposed on the center of the body side surface and slide rails (not shown) disposed on the roof side and the floor side of the body side surface. The slide door 2 is constructed so that a platform 4 can be opened and closed by sliding along the body side surface between a fully opened position (see a two-dot chain line in the drawing) in which the platform 4 is fully opened and an illustrated fully closed position in which the platform 4 is fully closed as an opening shown the body side surface. In addition, the slide door 2 is in a state of being grounded (earthed) through a component of the vehicle 1.

Also, a locking mechanism (not shown) for engaging the body with the slide door 2 is disposed between a front side panel of the slide door 2 and a back end surface of a door pillar 5 of the body. Then, the slide door 2 is constructed so as to be locked in the fully closed position by this locking mechanism when the slide door 2 is slid to the illustrated fully closed position.

Figure 2:
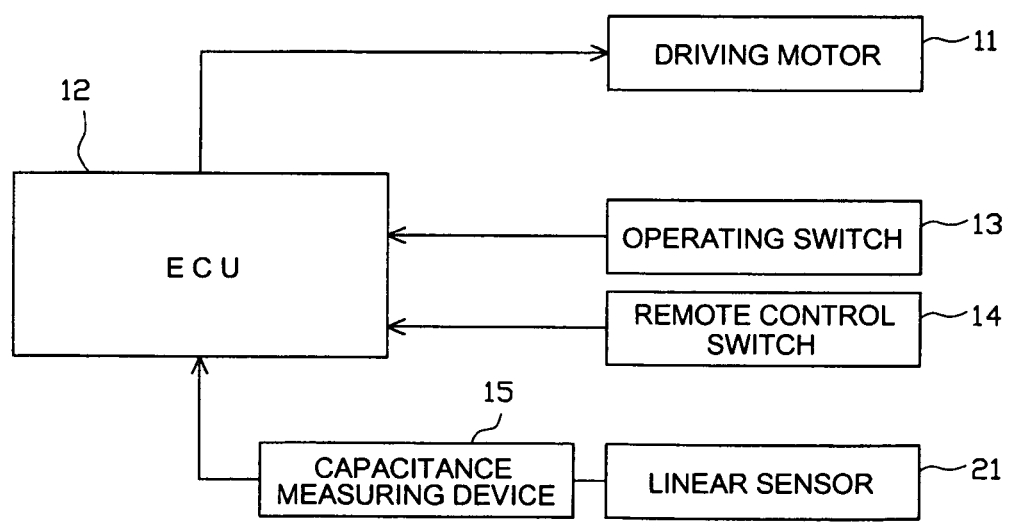
FIG. 2 is a block diagram showing an electrical configuration of an ECU etc.

Also, an automatic opening and closing mechanism (not shown) is disposed inside the slide door 2. The automatic opening and closing mechanism is a mechanism for sliding the slide door 2 in at least the fully opened position to the fully closed position. Additionally, the automatic opening and closing mechanism includes a driving motor 11 for opening and closing the slide door 2, and an electronic control unit (ECU) 12 for driving and controlling the driving motor 11 as shown in FIG. 2. A closing command signal etc. are constructed so as to be inputted from an operating switch 13 arranged in a driver seat, a remote control switch 14, etc. placed inside a vehicle compartment to the ECU 12. Also, the ECU 12 can grasp where the slide door 2 is at present (including the fully opened position and the fully closed position) based on a signal from the driving motor 11 or a separate detection sensor (not shown).

In addition, in the case of inputting the closing command signal when the platform 4 is in an opened state (for example, the slide door 2 is in the fully opened position), the ECU 12 performs normal rotation driving control of the driving motor 11. Consequently, the slide door 2 is constructed so as to be slid to the fully closed position and be locked in the fully closed position. Then, when the lock is completed, the action of the driving motor 11 is stopped.

Further, in the present embodiment, a linear sensor 21 capable of detecting that a foreign body is present in a gap between the slide door 2 and a peripheral edge of the platform 4 is disposed in an end edge of the slide door 2. The linear sensor 21 is connected to a capacitance measuring device 15, and the capacitance measuring device 15 is electrically connected to the ECU 12. Here, the capacitance measuring device 15 is constructed so that capacitance, for example, between an attachment base 22 (the slide door 2) and an electrode 26 described below can be measured every predetermined time and (information about) the measured capacitance is transmitted to the ECU 12. In the embodiment, the ECU 12 detects that the foreign body is present in the gap between the slide door 2 and the peripheral edge of the platform 4 when a change ratio of the transmitted capacitance to the capacitance (reference capacitance) measured just before is larger than a preset threshold value. Then, it is constructed so as to perform reverse rotation driving control for moving the slide door 2 in an opened direction while once stopping a closing action of the driving motor 11. That is, the ECU 12 is also constructed so as to perform a function as a stop controller. In addition, the threshold value is set at a value in which a wrong determination is not made (the ECU 12 does not determine that the foreign body is present) when a water drop adheres to the linear sensor 21 and its periphery.

Figure 3:
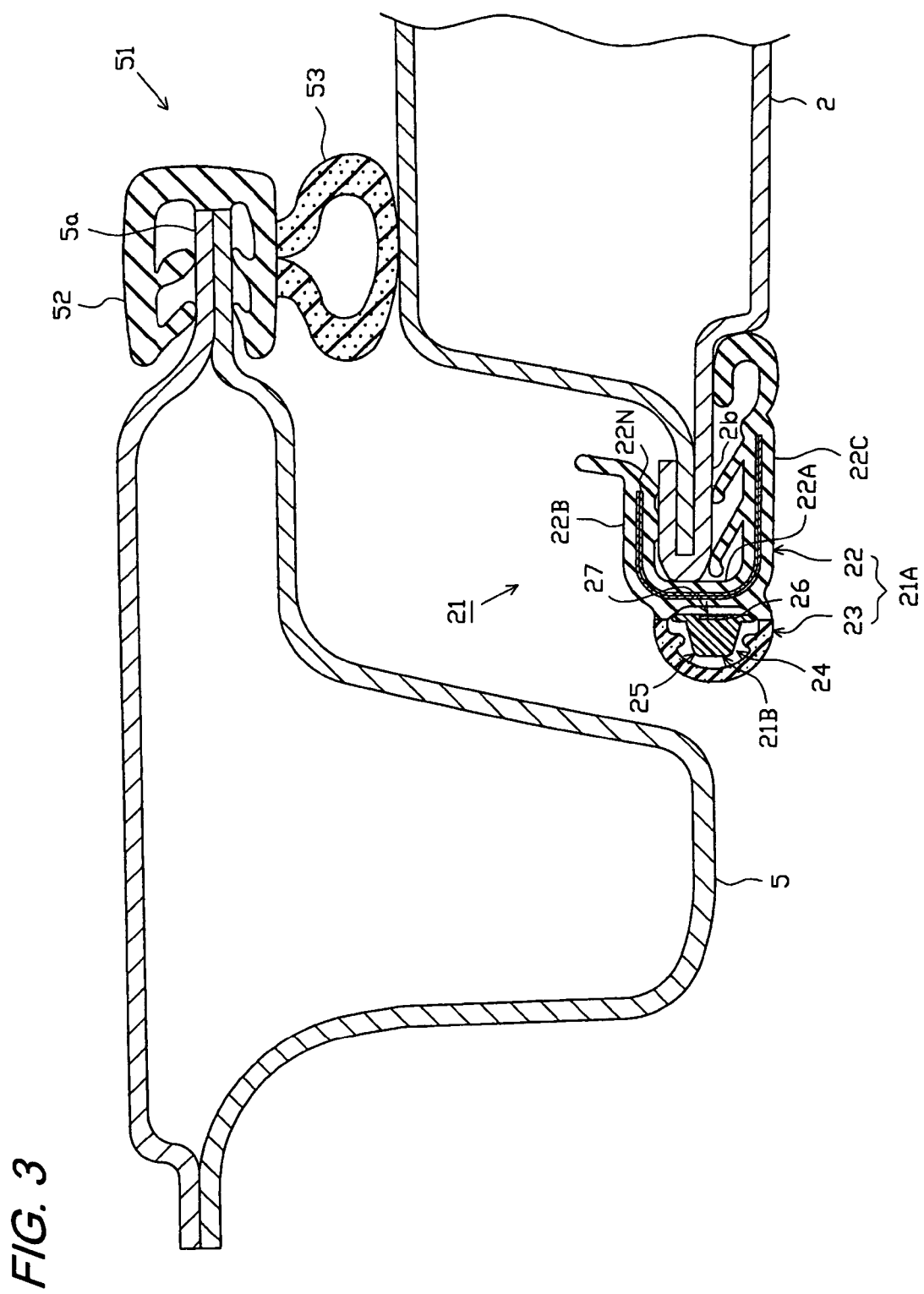
FIG. 3 is a sectional view taken on line J-J in FIG. 1.

Next, details of the linear sensor 21 etc. will be described. FIG. 3 is a sectional view taken on line J-J of FIG. 1 showing the front end edge of the slide door 2, the door pillar 5 of the body, etc. As shown in FIG. 3, a weather strip 51 is disposed in a flange 5a vertically extending along the back end side of the door pillar 5 of the body. The weather strip 51 seals a gap between the body and the slide door 2 when the slide door 2 is slid to the fully closed position. In addition, the slide door 2 is positioned in the obliquely lower right in the drawing from this fully closed position just before the slide door 2 is fully closed.

The weather strip 51 is obtained by extrusion molding, and includes an attachment base 52 inserted and fixed in the flange 5a, and a hollow seal part 53. In the embodiment, the attachment base 52 is formed by EPDM solid rubber and the seal part 53 is formed by EPDM sponge rubber. Then, the seal part 53 is constructed so as to perform a seal function by being pressed and crushed and deformed by an inner panel of the slide door 2.

Next, the linear sensor 21 will be described. In the embodiment, the linear sensor 21 is attached to substantially the whole area of a front end 2b of the slide door 2 opposed to the door pillar 5 of the body. As a result of this, it can be detected whether or not a foreign body is present over the whole area between the back end side of the door pillar 5 and the front end edge of the slide door 2 opposed to the door pillar 5 when the slide door 2 is slid to the fully closed position.

Further, the linear sensor 21 includes a first sensor structural body 21A and a second sensor structural body 21B.

Figure 4:
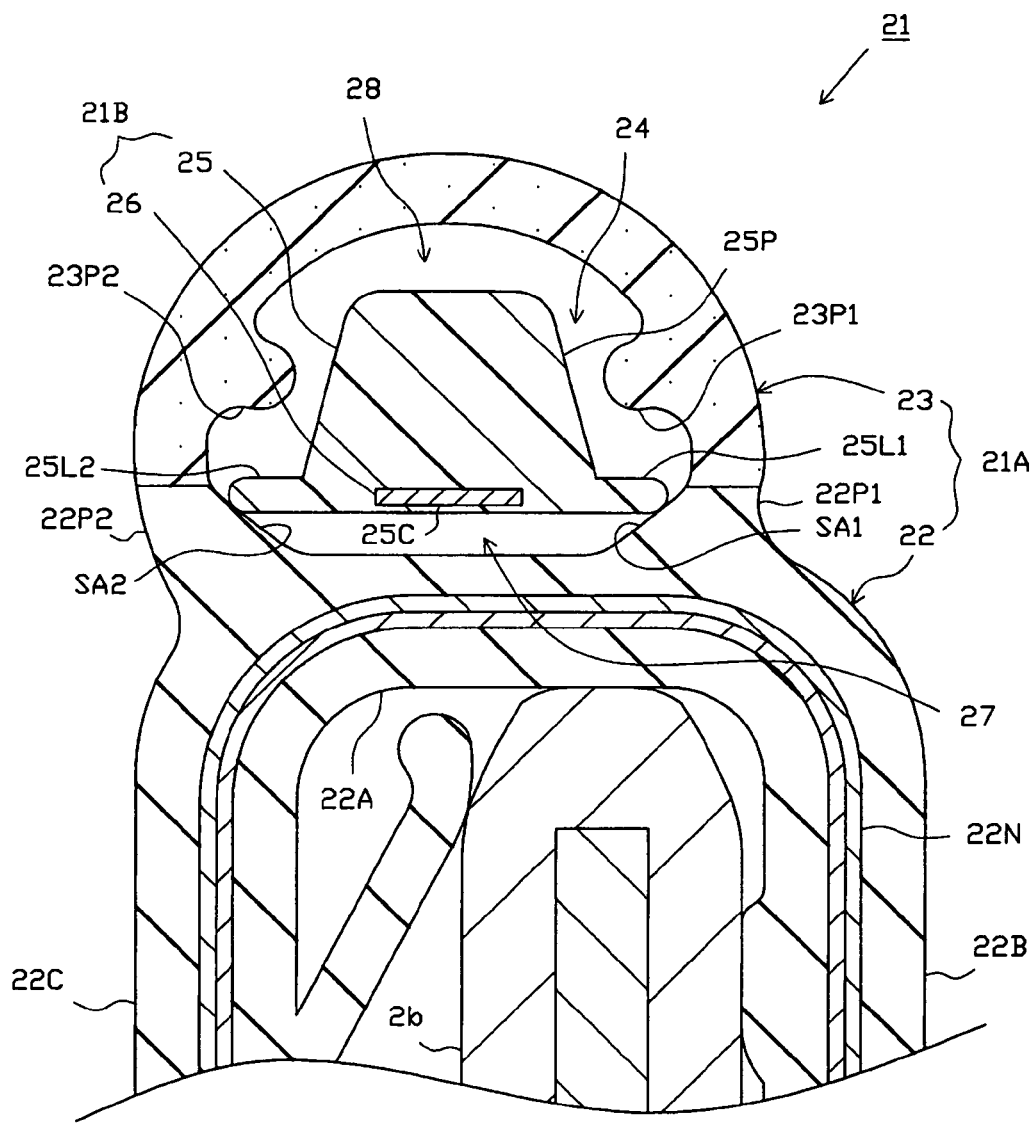
FIG. 4 is a partially enlarged sectional view of the linear sensor.

As shown in FIG. 4, the first sensor structural body 21A includes the attachment base 22 fixed to the front end 2b of the slide door 2, and a skin cover part 23 bulging from the attachment base 22 to the side of the door pillar 5.

The attachment base 22 is formed by extruding EPDM solid rubber, and includes a basal part 22A and a pair of side walls 22B, 22C extending from the basal part 22A to the side opposite to the skin cover part 23. Additionally, a pair of protrusions 22P1, 22P2 protruding to the side of the door pillar 5 is formed in both end edges of the basal part 22A. In the embodiment, regions of the side of a hollow part 24 described below in the protrusions 22P1, 22P2 are formed in tapered inclined surfaces SA1, SA2. Additionally, a metallic insert 22N is embedded in the attachment base 22.

The skin cover part 23 is formed by EPDM sponge rubber, and is formed in a circular arc-shaped section bulging from the protrusions 22P1, 22P2 to the side of the door pillar 5. Also, the hollow part 24 is formed inside the skin cover part 23 and also the skin cover part 23 is formed relatively thin. As a result, the skin cover part 23 can easily be deformed at the time of making contact with the foreign body etc.

Further, the second sensor structural body 21B is arranged inside the hollow part 24. The second sensor structural body 21B includes an insulator 25 with a long shape, and the electrode 26 embedded inside the insulator 25.

The insulator 25 is formed by extruding an insulating material (for example, olefinic thermoplastic elastomer (TPO)) having flexibility. Also, the insulator 25 has an insulator side projection 25P protruding toward the side of the skin cover part 23. Further, a pair of legs 25L1, 25L2 is disposed in regions of the side of the attachment base 22 in the insulator 25, and the legs 25L1, 25L2 abut on the inclined surfaces SA1, SA2.

The electrode 26 is a band-shaped flat-braid copper wire (a net-like copper wire with a flat plate shape) with good durability to bending or torsion, and is placed as opposed to the basal part 22A of the attachment base 22. Also, a surface opposed to the attachment base 22 in the electrode 26 is covered with a cover part 25C of the insulator 25 without being exposed to a surface of the insulator 25. Then, a thickness of the cover part 25C is set in the range of 50 μm to 300 μm (more preferably, 100 μm to 200 μm).

In addition, the legs 25L1, 25L2 of the insulator 25 are constructed so as to extend toward a direction intersecting with a direction orthogonal to the surface opposed to the attachment base 22 in the electrode 26 (toward a width direction of the basal part 22A in the embodiment). As a result, when a pressing force is applied from the side of the door pillar 5 to the linear sensor 21, it is constructed so that roots of the legs 25L1, 25L2 bend and thus the electrode 26 approaches and makes contact with the attachment base 22 (the basal part 22A). In addition, in the embodiment, hardness of the region constructing at least the legs 25L1, 25L2 is set in the range of 30 Shore A to 60 Shore A. As a result, the roots of the legs 25L1, 25L2 are constructed so as to bend relatively easily.

Further, cover side projections 23P1, 23P2 protruding to the side of the insulator 25 (the insulator side projection 25P) are formed in the side of the basal part 22A in an inner peripheral surface of the skin cover part 23. Also, a distance between the mutual cover side projections 23P1, 23P2 is set more narrowly than a distance between the mutual tops of the legs 25L1, 25L2. Consequently, relative movement of the legs 25L1, 25L2 to the side of the door pillar 5 beyond the cover side projections 23P1, 23P2 is regulated and thus, relative rotation of the second sensor structural body 21B to the first sensor structural body 21A is regulated. Consequently, a sensing condition can be stabilized (a change in capacitance can be detected stably).

Additionally, a gap 27 is formed between a surface of the attachment base 22 (the basal part 22A) and a surface of the insulator 25 in the side of the basal part 22A. In the gap 27, a maximum value of a distance between the electrode 26 and the attachment base 22 is set at 0.5 mm or more.

Further, the electrode 26 is electrically connected to a charge supply device (not shown), and a predetermined charge is supplied from the charge supply device. On the other hand, the attachment base 22 is attached to the slide door 2 and is in a grounded state. Therefore, a capacitor is constructed by the electrode 26 and the grounded attachment base 22 (a grounding minus pole). Also, the capacitance measuring device 15 is connected to the electrode 26, and the capacitance measuring device 15 is constructed so as to measure capacitance between at least the electrode 26 and the attachment base 22 (the grounding minus pole). In addition, when the foreign body approaches the periphery of the linear sensor 21, the capacitance measured by the capacitance measuring device 15 changes by the amount of capacitance had by the foreign body.

Further, in the hollow part 24, space 28 filled with air is disposed between the inner peripheral surface of the skin cover part 23 and a surface of the insulator 25 in the side of the skin cover part 23. In the space 28, a maximum value of a distance between the skin cover part 23 and the insulator 25 is set at 0.5 mm or more.

Next, a method for manufacturing the linear sensor 21 described above will be described.

First, EPDM unvulcanized rubber forming the attachment base 22 and EPDM unvulcanized foamed rubber forming the skin cover part 23 together with the insert 22N are continuously supplied to an extruder (not shown) made by including a die (not shown) for molding the first sensor structural body 21A. Consequently, a first intermediate molded body (not shown) resulting in the first sensor structural body 21A is extruded from the die. In addition, a region corresponding to the attachment base 22 in the first intermediate molded body is molded in substantially a flat plate shape in an opened state. Next, the obtained first intermediate molded body is conveyed to a predetermined vulcanizing tank and also, the first intermediate molded body is vulcanized and foamed by hot air, high-frequency waves, etc. in the vulcanizing tank. Then, the first intermediate molded body is folded and the attachment base 22 is formed in a predetermined shape and is cut in a predetermined length and thereby, the first sensor structural body 21A is obtained.

Next, the electrode 26 and TPO in a plasticization state are continuously supplied to an extruder (not shown) having a die (not shown) for molding the second sensor structural body 21B. Consequently, a second intermediate molded body (not shown) resulting in the second sensor structural body 21B is extruded from the die. Then, the second intermediate molded body is cooled and solidified and also is cut in a predetermined length. Consequently, the second sensor structural body 21B is obtained.

Thereafter, the second sensor structural body 21B is inserted into the hollow part 24 of the first sensor structural body 21A while maintaining a positional relation between the first sensor structural body 21A and the second sensor structural body 21B in a predetermined position. Further, the linear sensor 21 described above is obtained by disposing an electrical connecting device to the capacitance measuring device 15 in the electrode 26.

Figure 5A:
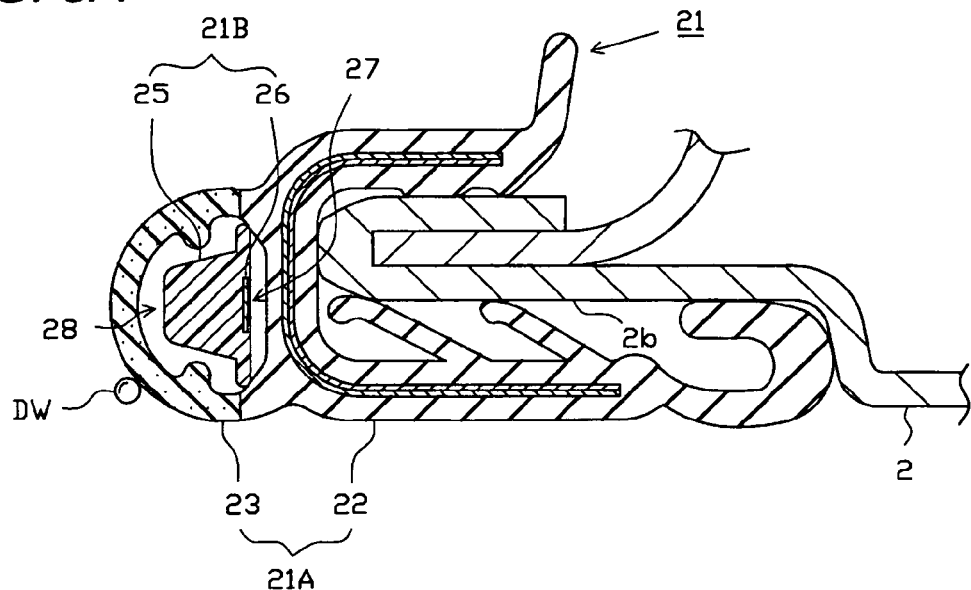
FIG. 5A is an enlarged sectional view of the linear sensor showing a state in which a water drop makes contact with a skin cover part.
Figure 5B:
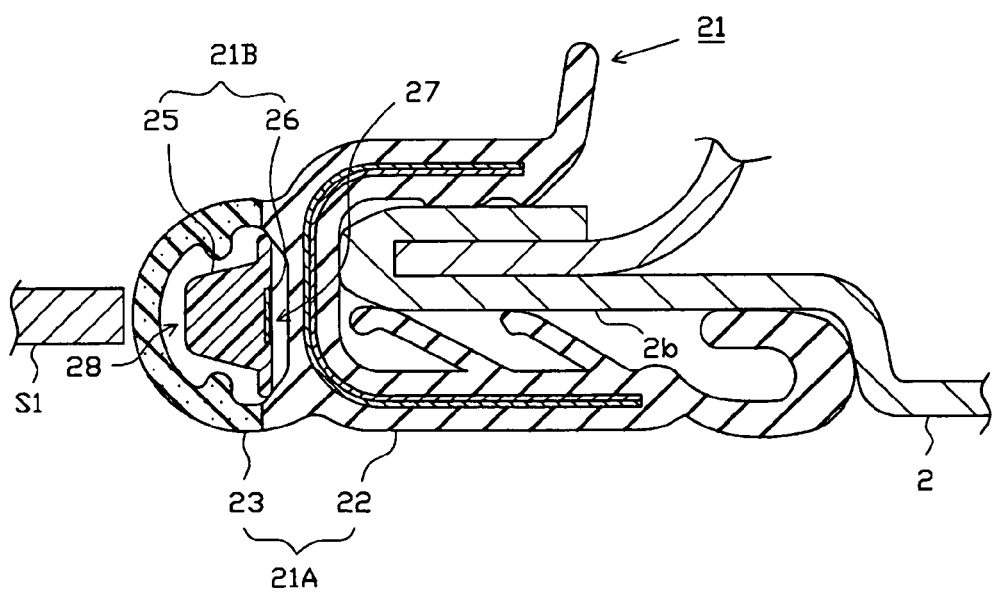
FIG. 5B is an enlarged sectional view of the linear sensor showing a state in which a foreign body approaches the linear sensor.
Figure 6:
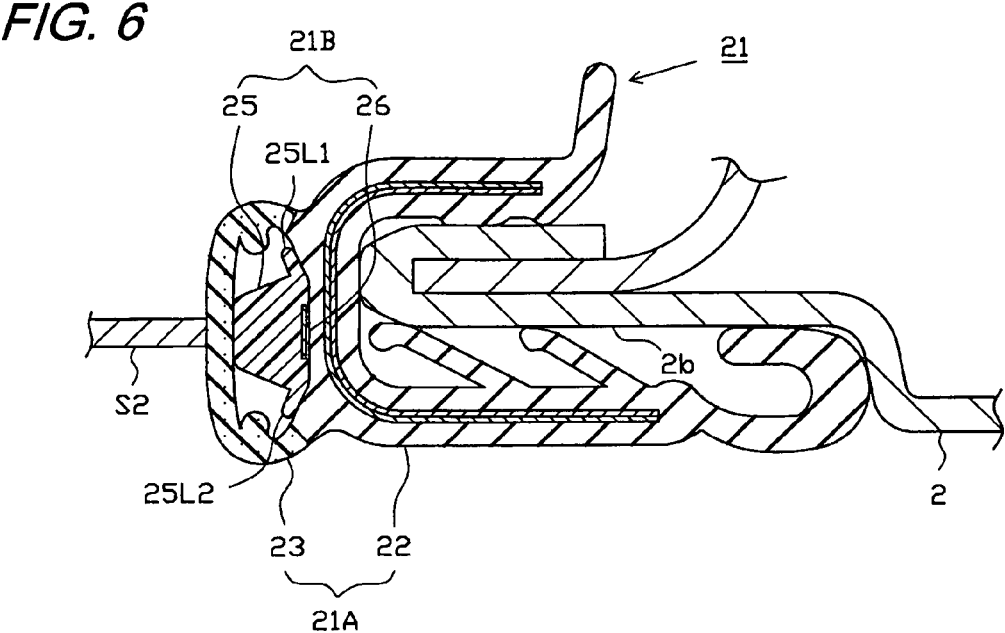
FIG. 6 is an enlarged sectional view of the linear sensor at the time when the foreign body is in a contact state.

Next, a, method for detecting a foreign body by the linear sensor 21 described above will be described using FIGS. 5A, 5B and 6. In addition, FIG. 5A shows a state (a water drop contact state) in which a water drop DW adheres to the linear sensor 21 (the skin cover part 23), and FIG. 5B shows a state in which a foreign body S1 with relatively large capacitance such as the human body approaches the linear sensor 21. Also, FIG. 6 shows a state (a contact state) in which a foreign body S2 (for example, an insulating material with a relatively small size such as a pen tip) makes contact with the skin cover part 23.

As shown in FIG. 5A, when the water drop DW adheres to the linear sensor 21, the space 28 filled with air is interposed between the water drop DW and the electrode 26. As a result, the amount of change in capacitance measured by the capacitance measuring device 15 becomes relatively small. Therefore, a ratio of change in capacitance becomes smaller than the preset threshold value, and the ECU 12 determines that the foreign body is not present (in other words, the ECU 12 does not determine that the water drop DW adhering to the linear sensor 21 is the foreign body).

On the other hand, as shown in FIG. 5B, when the foreign body S1 such as the human body approaches the linear sensor 21, the foreign body S1 has a relatively high water content, so that the amount of change in capacitance becomes sufficiently large even when the space 28 is interposed. Therefore, when the foreign body S1 approaches, the ratio of change in capacitance exceeds the threshold value and the ECU 12 decides that the foreign body is present. That is, the foreign body S1 such as the human body is constructed so as to be detected in a stage of approaching the linear sensor 21.

On the other hand, when the foreign body S2 such as an insulating material, a material with a relatively low water content or a material with a relatively small size approaches and makes contact, the amount of change in capacitance becomes relatively small. As a result, the ratio of change in capacitance can become smaller than the threshold value.

In this case, the foreign body S2 only approaches the linear sensor 21 and thereby the foreign body S2 cannot be detected, and the foreign body S2 makes contact with the linear sensor 21 (the skin cover part 23) as shown in FIG. 6. At this time, the roots of the legs 25L1, 25L2 bend and the gap 27 is crushed and deformed and thereby, capacitance between the electrode 26 and the attachment base 22 changes greatly. As a result, the ratio of change in capacitance also becomes large and the ECU 12 detects that the foreign body S2 is present.

According to the embodiment as described above in detail, the attachment base 22 is used as the grounding minus pole, so that even for the one electrode 26 disposed, the foreign body can be detected based on the capacitance between the electrode 26 and the attachment base 22. Therefore, a material cost can be reduced as compared with the case of disposing two electrodes. Also, in the case of manufacturing the linear sensor 21, work of adjusting a positional relation between mutual electrodes is not required, and the insulator 25 (the second sensor structural body 21B) in which the electrode 26 is embedded needs only to be placed so as to have a predetermined positional relation to the attachment base 22 (the first sensor structural body 21A). As a result, the sensor can be manufactured very easily and in combination with the reduction in the material cost, a manufacturing cost can be reduced remarkably.

Also, in view of sensitivity for detecting the foreign body by the linear sensor 21 of the embodiment, for the foreign body with relatively large capacitance such as the human body, the capacitance between the electrode 26 and the attachment base 22 (the grounding minus pole) changes relatively greatly in the stage of approaching the sensor, so that the foreign body can be detected with high sensitivity in a noncontact state. Further, since the gap 27 is disposed between the electrode 26 and the attachment base 22, for the foreign body with small capacitance or the foreign body with a small contact area such as a pencil, the foreign body makes contact with the linear sensor 21 (the skin cover part 23) and the gap 27 is crushed and deformed and thereby, the capacitance can be changed greatly. That is, according to the linear sensor 21, even the foreign body with the small capacitance or the small contact area as well as the human body etc. can be detected with high sensitivity.

Further, the cover part 25C with the thickness of 50 μm to 300 μm is provided, so that wear and damage of the electrode 26 can be prevented more securely over a longer period and also high accuracy of detection of the foreign body can be maintained.

Additionally, the insulator side projection 25P and the cover side projections 23P1, 23P2 are provided, so that the gap 27 can be crushed and deformed more securely even when the amount of deformation of the skin cover part 23 in the case of making contact with the foreign body is small. As a result, the accuracy of detection of the foreign body can be improved further.

Also, the space 28 which is filled with air and has a relatively low dielectric constant is disposed between the skin cover part 23 and the insulator 25, so that the amount of change in capacitance at the time when the water drop adheres can be made relatively small. As a result, a wrong determination associated with the adhesion of the water drop can be prevented more securely.

In addition, without being limited to the description of the embodiment described above, for example, the following may be implemented. Of course, other application examples and change examples which are not illustrated below can be implemented.

Figure 7:
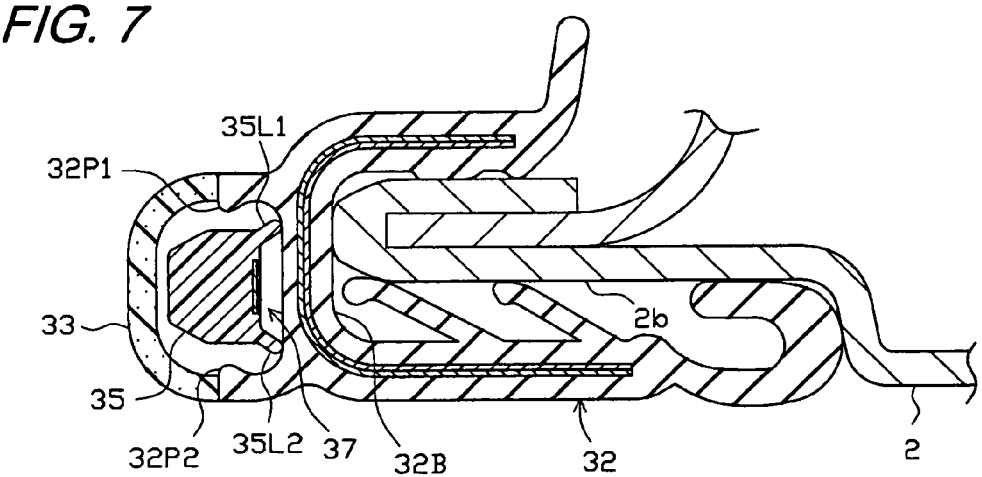
FIG. 7 is an enlarged sectional view of a linear sensor in another embodiment.

(a) The embodiment is constructed so that the legs 25L1, 25L2 of the insulator 25 extend along the width direction of the basal part 22A and also the legs 25L1, 25L2 abut on the inclined surfaces SA1, SA2 of the basal part 22A and thereby the gap 27 is crushed easily when a pressing force is applied to the insulator 25. On the other hand, as shown in FIG. 7, it may be constructed so that legs 35L1, 35L2 of an insulator 35 is formed in substantially a flare-shape section extending in a direction oblique to a width direction of a basal part 32B and thereby a gap 37 is crushed when a pressing force is applied to the insulator 35.

(b) In the embodiment, relative rotation of the insulator 25 (the second sensor structural body 21B) to the skin cover part 23 (the first sensor structural body 21A) is regulated by providing the cover side projections 23P1, 23P2 extending from the inner peripheral surface of the skin cover part 23 to the side of the insulator 25. On the other hand, as shown in FIG. 7, relative rotation of the insulator 35 to a skin cover part 33 may be regulated by providing projections 32P1, 32P2 protruding from an inner peripheral surface (a surface of the side of a hollow part) of an attachment base 32.

Also, regions in which the projections are provided are not limited to the skin cover part 23 (33) or the attachment base 22 (32) and, for example, the projections may be provided so as to protrude from an outer peripheral surface of the insulator 25 (35) to the side of the skin cover part 23 (33).

Figure 8:
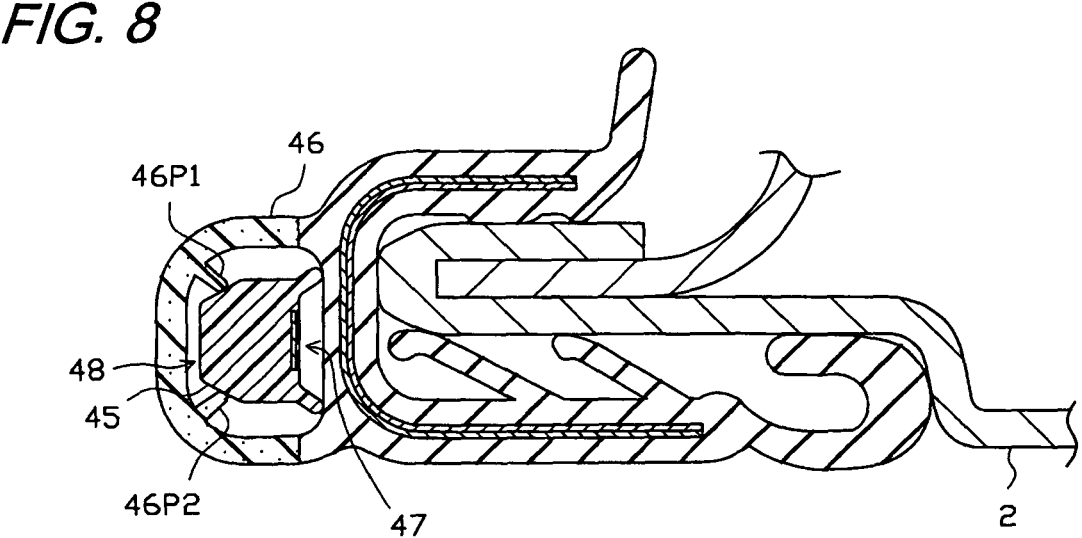
FIG. 8 is an enlarged sectional view of a linear sensor in a further embodiment.

(c) In the embodiment, the cover side projections 23P1, 23P2 of the skin cover part 23 is formed in the noncontact state with respect to the insulator 25, but cover side projections 46P1, 46P2 of a skin cover part 46 may be constructed so that the tops of the cover side projections 46P1, 46P2 make contact with an insulator 45 as shown in FIG. 8. In this case, a shape of space 48 can be maintained more securely and also, a gap 47 can be crushed and deformed more easily when a pressing force is applied to the skin cover part 46. As a result, a foreign body can be detected more securely.

(d) In the embodiment, the ECU 12 detects the foreign body based on the ratio of change in capacitance, but the foreign body may be detected based on the amount of change in capacitance. Also, instead of the capacitance measuring device 15, an oscillation circuit is electrically connected to the electrode 26 and also a frequency measuring device for measuring a frequency signal in response to an oscillation output from the oscillation circuit according to temporal change in capacitance is provided and the foreign body may be detected based on the frequency signal measured by the frequency measuring device.

(e) In the embodiment, the electrode 26 is constructed of the flat braid copper wire, but may be constructed of, for example, a band-shaped carbon-containing material (conductive resin) or metal foil made of a metal material with high conductivity.

(f) In the embodiment, TPO is illustrated as the material forming the insulator 25, but the insulator 25 may be formed by other materials having flexibility such as EPDM sponge rubber.

(g) In the embodiment, the attachment base 22 is constructed by including the insert 22N, but the insert 22N may be omitted.

(h) In the embodiment, the case of having the slide door 2 for opening and closing the platform 4 disposed on the body side surface is embodied. In other words, the opening and closing body in the embodiment is the slide door 2. On the other hand, the technical idea of the invention may be applied to other opening and closing bodies (for example, a non-slide type). As the other opening and closing bodies, for example, a back door of a hatch-back type in which the upper part is supported, a sliding roof for opening and closing a roof part of a vehicle or door glass for opening and closing a window of a door can be given.

What is claimed is:

1. A linear sensor comprising:
an attachment base attached to a metallic edge of an opening and closing body capable of opening and closing an opening disposed in a vehicle body,
a skin cover part which bulges from the attachment base toward a peripheral edge side of the opening and includes a hollow part in the inside thereof,
an insulator which includes flexibility and is embedded in the hollow part, and
a plate-shaped electrode opposed to the attachment base, at least a portion of the electrode being embedded in the insulator,
wherein a gap is disposed between the electrode and the attachment base in the hollow part, and the electrode is set in a plus pole and the attachment base is set in a minus pole as grounding, and proximity and/or contact between a foreign body and the skin cover part is detected based on a change in capacitance between the electrode and the minus pole,
wherein a cover side projection protruding toward the insulator side is disposed in an inner peripheral surface of the skin cover part, and wherein the cover side projection is formed in a non-contact state with respect to the insulator.

2. A linear sensor according to claim 1, wherein a surface opposed to the attachment base in the electrode is covered with the insulator, and
wherein a thickness of a cover part of the insulator, with which the opposed surface in the electrode is covered, is set in a range of 50 μm to 300 μm.

3. A linear sensor according to claim 1, wherein an insulator side projection protruding toward the skin cover part is disposed in the insulator.

4. A linear sensor according to claim 1, wherein two legs extending so as to intersect with a direction orthogonal to the surface opposed to the attachment base in the electrode are disposed in regions of the attachment base side in the insulator, and the gap is disposed between both of the legs.

5. A linear sensor as according to claim 4, wherein a hardness of the legs is set to a range of 30 Shore A to 60 Shore A.

6. A linear sensor as according to claim 4, wherein the skin cover part includes two cover side projections which protrude toward an outside edge of the insulator.

7. A linear sensor as according to claim 6, wherein a distance between the cover side projections is less than a distance between a mutual top of the legs.

8. A linear sensor as according to claim 1, wherein a space comprising air is disposed between the skin cover part and the insulator.

9. A linear sensor as according to claim 8, wherein the hollow part is configured so as to space apart the insulator from the skin cover part.

10. A linear sensor as according to claim 1, further comprising a pair of protrusions formed in an interior edge of the attachment base,
wherein the skin cover part is formed in a circular arch-shape bulging from the protrusions in a direction towards the opening.

11. A linear sensor as according to claim 1, wherein a maximum value of a distance between the electrode and the attachment base is set in a range of 0.5 mm to 3.0 mm.

12. A linear sensor as according to claim 1, wherein a maximum value of a distance between the skin cover part and the insulator is set to 0.5 mm or more.

13. A linear sensor as according to claim 1, wherein the hollow part opposes the gap.

14. A linear sensor as according to claim 1, wherein a space comprising air is disposed between the cover side projection and the insulator.

15. A linear sensor as according to claim 1, wherein the skin cover part comprises ethylene propylene diene monomer (EPDM) sponge rubber, and
wherein the attachment base comprises ethylene propylene diene monomer (EPDM) solid rubber.

16. A linear sensor as according to claim 1, wherein the insulator comprises olefinic thermoplastic elastomer.

17. A linear sensor as according to claim 1, wherein the electrode comprises a band-shaped flat braid copper wire.

18. A linear sensor comprising:
an attachment base attached to a metallic edge of an opening and closing body capable of opening and closing an opening disposed in a vehicle body;
a skin cover part which bulges from the attachment base toward a peripheral edge side of the opening and includes a hollow part in the inside thereof;
an insulator which includes flexibility and is embedded in the hollow part; and
a plate-shaped electrode opposed to the attachment base, at least a portion of the electrode being embedded in the insulator,
wherein a gap opposing the hollow part is disposed between the insulator and the attachment base, and the electrode is set in a plus pole and the attachment base is set in a minus pole as grounding, and at least one of proximity and contact between a foreign body and the skin cover part is detected based on a change in capacitance between the electrode and the minus pole,
wherein a cover side projection protruding toward the insulator side is disposed in an inner peripheral surface of the skin cover part, and
wherein the cover side projection is formed in a non-contact state with respect to the insulator.

19. A linear sensor comprising:
an attachment base attached to a metallic edge of an opening and closing body capable of opening and closing an opening disposed in a vehicle body,
a skin cover part which bulges from the attachment base toward a peripheral edge side of the opening and includes a hollow part in the inside thereof,
an insulator which includes flexibility and is embedded in the hollow part, and
a plate-shaped electrode opposed to the attachment base, at least a portion of the electrode being embedded in the insulator,
wherein a gap is disposed between the electrode and the attachment base in the hollow part, and the electrode is set in a plus pole and the attachment base is set in a minus pole as grounding, and proximity and/or contact between a foreign body and the skin cover part is detected based on a change in capacitance between the electrode and the minus pole, wherein a cover side projection protruding toward the insulator side is disposed in an inner peripheral surface of the skin cover part,
wherein a space comprising air is disposed between the cover side projection and the insulator.

20. A linear sensor as according to claim 19, wherein the cover side projection is formed in a non-contact state with respect to the insulator.

* * * * *